(12) United States Patent
Vann

(10) Patent No.: US 6,664,655 B2
(45) Date of Patent: Dec. 16, 2003

(54) MULTAXEL WINDMILL

(76) Inventor: Charles S. Vann, 1425 Drake Ave., Burlingame, CA (US) 94010

( * ) Notice: Subject to any disclaimer, the term of this patent is extended or adjusted under 35 U.S.C. 154(b) by 51 days.

(21) Appl. No.: 10/165,797

(22) Filed: Jun. 6, 2002

(65) Prior Publication Data

US 2003/0122381 A1 Jul. 3, 2003

Related U.S. Application Data

(63) Continuation-in-part of application No. 10/036,975, filed on Dec. 31, 2001, now abandoned.

(51) Int. Cl.[7] .............................. F03D 9/00; F03D 7/00
(52) U.S. Cl. .............................. 290/55; 290/44; 416/13
(58) Field of Search .............................. 290/43, 44, 54, 290/55; 416/13, 16

(56) References Cited

U.S. PATENT DOCUMENTS

| | | | | |
|---|---|---|---|---|
| 4,289,970 A | * | 9/1981 | Deibert | 290/44 |
| 4,330,714 A | * | 5/1982 | Smith | 290/55 |
| 4,455,833 A | * | 6/1984 | Tiboldi | 60/641.15 |
| 4,575,639 A | * | 3/1986 | Rogow et al. | 290/55 |
| 5,436,508 A | * | 7/1995 | Sorensen | 290/55 |
| 6,435,827 B1 | * | 8/2002 | Steiner | 416/8 |
| 2003/0030283 A1 | * | 2/2003 | Lusk | 290/44 |
| 2003/0035725 A1 | * | 2/2003 | Sosonkina | 416/11 |

* cited by examiner

Primary Examiner—Nicholas Ponomarenko

(57) ABSTRACT

The multiaxel windmill has multiple blades attached to a rim that rotates on multiple wheels rather than about a single axel. The blades are many and short and positioned far from the axis of rotation such that the full blade length rotates at maximum velocity. This allows blades to be oriented for high-efficiency lift. This design is more easily scaled to large power because larger weight and more blades are easily supported. A starter motor permits use of optimum-efficient, pure-lift blades, and no blade twist and double-end support enables those blades to be simpler, lighter, and cheaper. Multiple blades surrounded by supports are easily seen and avoided by birds.

11 Claims, 4 Drawing Sheets

MULTAXEL WINDMILL

CROSS-REFERENCE TO RELATED APPLICATIONS

This application is a continuation in part to application serial number 10/036,975, filled Dec. 31 2001 now abandoned, titled "Multi-axel Windmill".

BACKGROUND

1. Field of Invention

This invention relates to windmills as structures harnessing wind to generate power.

2. Description of Prior Art

Windmills have been in existence for thousands of years. However, all the designs have one thing in common-they only have one axel. Blades are fixed to the axel and the axel revolvers inside a hub. A tower usually elevates the hub while allowing a large tail behind the hub to rotate the windmill axel directly into the wind. Wind passing around a plurality of blades creates drag or lift that forces the axel to rotate inside the hub. This design is simple to construct but it has several limitations.

First, single-axis windmills are not as mechanically efficient as possible. At high tip velocity, blades cutting perpendicular into the wind, generating more than 10 times more power than drag devices. Therefore, the most efficient windmill would have blades designed for pure lift all along the blade. In contrast, single-axis windmills provide high velocity only at the tip of the blade. The remaining blade has linearly decreasing velocity as it approaches near zero at the hub. To generate power at lower velocity, the angle of cut into the wind is varied along the blades (twist) producing considerable drag rather than the much more efficient lift force.

Secondly, single-axel windmills have poor economy of scale. It is desirable to increase power per windmill with proportionally less cost and less land. A logical economy of scale is to increase wind intersection by adding more blades. However, with single-axel windmills adding more blades can actually lower power generation by stalling the wind (excessive solidity). To avoid this problem, power windmills typically limit the number of blades to three or less and increase wind intersection by making the blades longer. Longer blades not only provide more wind intersection but also produce higher velocity for a given wind speed. But the highest blade velocity is still only at the tip, and the rest of the blade still suffers from decreasing velocity along the blade length. Also, long blades sweep so much area that they actually have too little solidity, grossly under utilizing available wind and land. Furthermore, as the windmills become larger, more weight is added to the top of the tower, requiring it to be stronger and more costly to build.

Third, starter motors are impractical because it would need to be collocated with the generator, adding too much weight and bulk to the top of the tower. Thus, windmill efficiency is often compromised for higher-drag design that starts easier.

Forth, the blades are complex, expensive, and dangerous. The blades must be very strong to absorb all the centrifugal force that dramatically increases with blade-length and tip velocity. Furthermore, the varying angle of attack along the blade length (twist) is complex and expensive.

Fifth and final, existing windmills can damage the environment. While windmills are a clean source of energy, the long, fast moving blades are often invisible to birds, killing thousands each year.

SUMMARY

In accordance with the present invention, multiple axels provide higher power-generating efficiency by enabling blade configurations where maximum blade velocity is achieved across the full length of the blade not just at the tip. The less-efficient middle of single-axel windmills is eliminated.

This windmill is economically scalable to very large size. The base supports all the windmill components, eliminating the need for large towers supporting massive weights at their tops. Regardless of windmill size, the mechanical stress on the blades is low because blades are mechanically supported at both ends. The design allows as many blades and at whatever size that optimize solidity, land-use, and power output.

Starter motors are practical since it can easily be located on the base, allowing a windmill design for maximum power.

Blades are simple. Designed for pure lift, there is no blade twist. Supported at both ends, the blades can be lighter without breaking apart.

The rim has a dual function as the magnet for the generator, reducing parts and increasing power output. The rim can be magnatized and sectioned to have different alternating magnetic poles that pass through wire coils fixed to the base, generating electrical power in the coils.

Finally, this windmill protects birds because the many blades surrounded by supports are easily seen and avoided by birds.

Objects and Advantages

Accordingly, advantages a multi-axel windmill has over a single axel windmill are:

More power-efficiency because full blade length rotates at maximum velocity.

Scalable to large power because more weight and more blades are easily supported.

Starter motor permits use of optimum-efficient, pure-lift blades.

No blade twist and double-end support enables simpler, lighter, and cheaper blades.

More power output from fewer components because the rim is also the generator magnet.

Multiple blades surrounded by supports are easily seen and avoided by birds.

DRAWING FIGURES

Reference is now made to two embodiments of this invention illustrated in FIGS. 1–6 when like numerals are used to designate like parts throughout.

Figure 1:
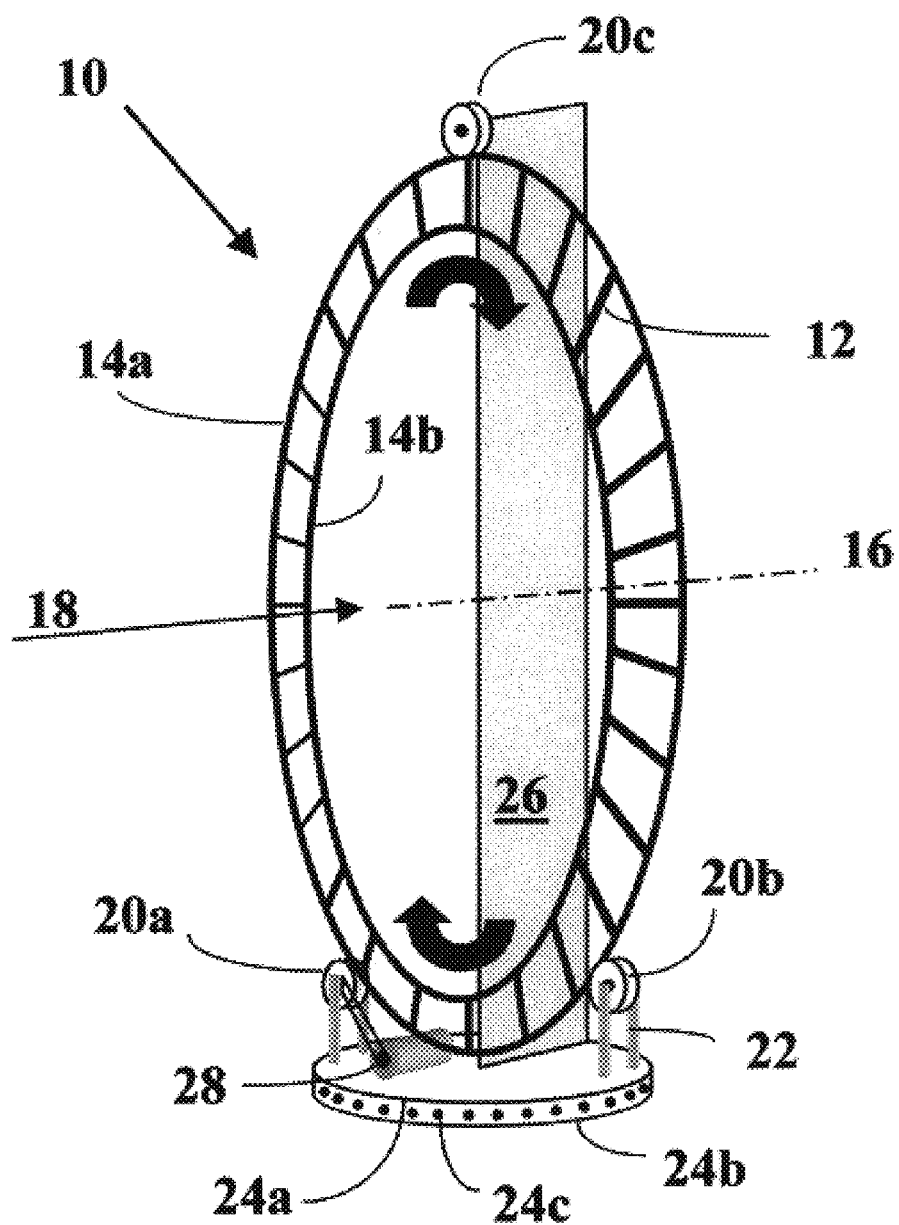
FIG. 1 is an isometric view of the first embodiment.

REFERENCE NUMERALS IN DRAWING 10 first embodiment 12 blades 14a,b rim
16 axis of rotation
18 wind
20a–c wheels
22 legs
24 base
26 tail
28 motor/generator
30 wheel axel
50 second embodiment
52 wire coil
54 magnets

DESCRIPTION OF FIRST EMBODIMENT

FIG. 1 shows the first embodiment 10 of an axel-less windmill consisting of a plurality of blades 12 fixed to a rim 14 that have an axis of rotation 16 parallel to the wind 18. Rim 14 is supported by wheels 20, and wheels 20 are supported by legs 22 that are fixed to base 24. Rim 14 may consist of one element or an outer 14a and inner 14b rim supporting blades 12 at both ends. Legs 22 elevate wheels 20a,b and wind tail 26 elevates wheel 20c into contact with rim 14. Generator/starter motor 28 is supported by base 24 and may be connected to one of the wheels 20 by belt, chain, or other means. Base 24 can have a top 24a and bottom 24b structure separated by rolling elements 24c such that the top structure 24a can freely roll on top of the fixed bottom structure 24c.

Figure 2:
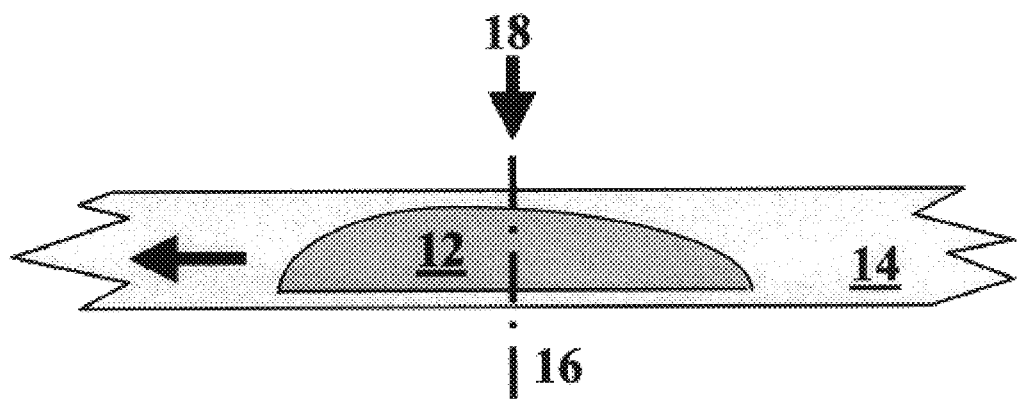
FIG. 2 is a cross section view of a blade in the first embodiment.

FIG. 2 shows a cross section view of blade 12 and rim 14 relative to axis of rotation 16.

Figure 3:
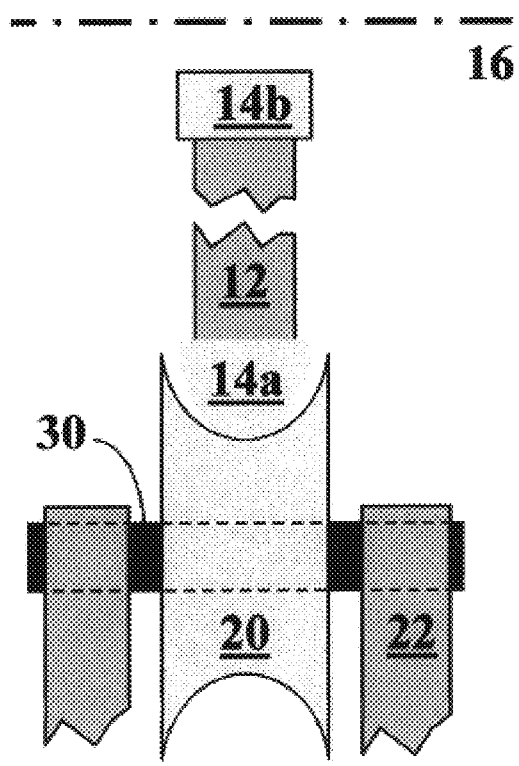
FIG. 3 is a cross section view of a wheel in the second embodiment.

FIG. 3 shows a cross section view of wheel 20. Wheel-axel 30 supports the wheel 20, and legs 22 support axel 30. Rim 14 fits inside wheel 20 such that its motion is constrained to only rotation about axis of rotation 16.

OPERATION OF FIRST EMBODIMENT

If wind-tail 26 is not parallel to the wind direction, wind 18 applies force on tail 26 causing base 24a to rotate on fixed base 24b by means of rolling elements 24c until tail 26 is parallel to wind 18, forcing blades 12 perpendicular to wind 18. Wind 18 creates lift on blades 12 such that each blade 12 forces rim 14 about axis of rotation 16.

DESCRIPTION OF SECOND EMBODIMENT

Figure 4:
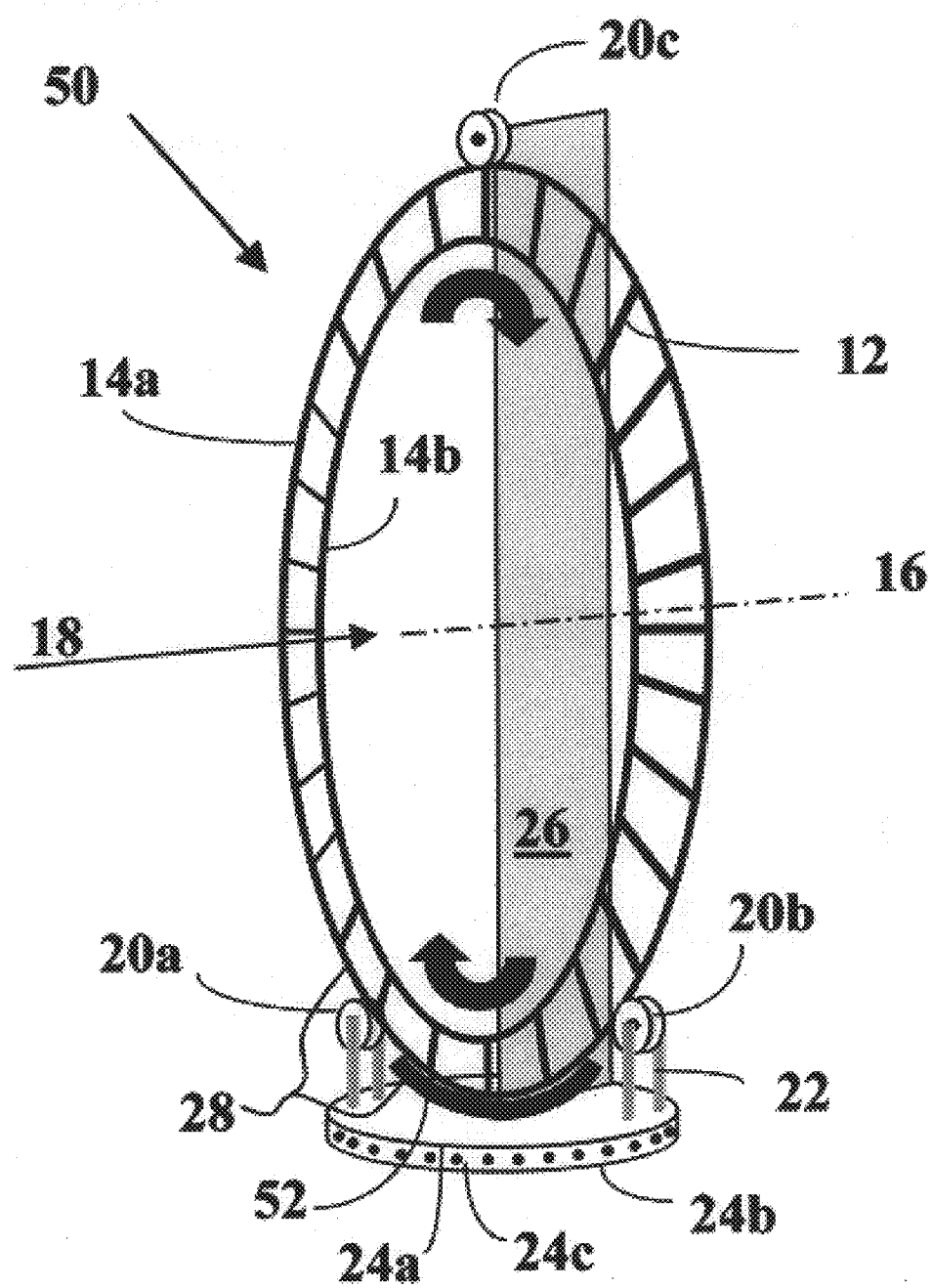
FIG. 4 is an isometric view of the second embodiment.

FIG. 4 shows second embodiment 50 having all the components of first embodiment 10 except rim 14 is the magnetic for motor/generator 28 and the remainder of motor/generator 28 is many wire coils 52 supported by base 24. In a preferred arrangement, rim 14 has many magnatized sections 54.

Figure 5:
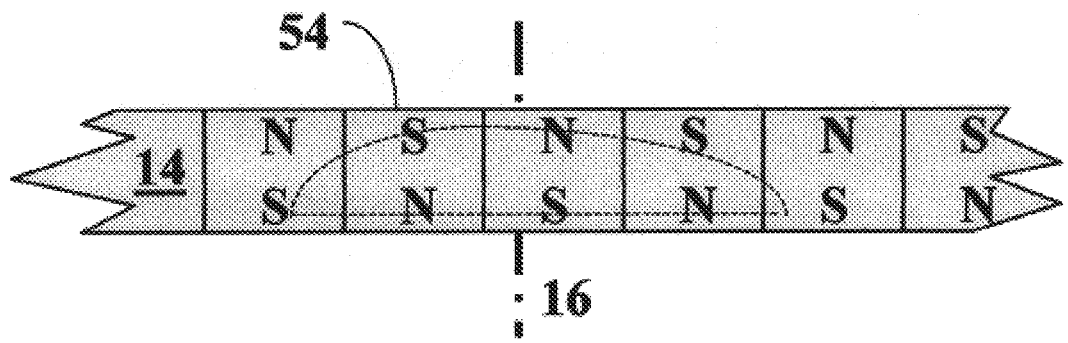
FIG. 5 is a side view of the outer rim of the second embodiment.

FIG. 5 shows a side view of rim 14 with a plurality of magnets 54.

Figure 6:
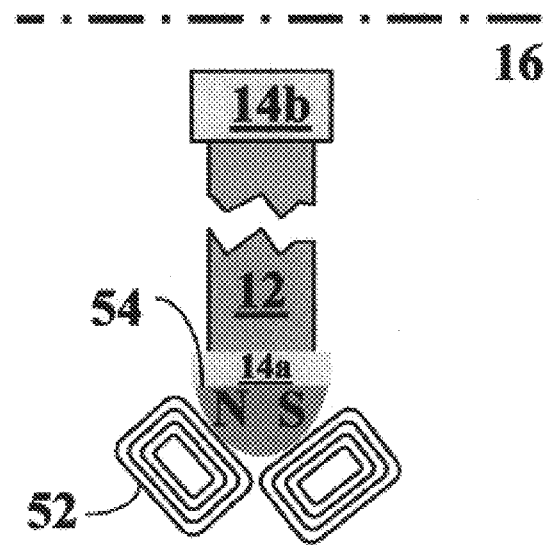
FIG. 6 is a cross section view of the wire coil in the second embodiment.

FIG. 6 shows a cross section view of wire coils 52 and rim 14 relative to blade 12 and axis of rotation 16.

OPERATION OF SECOND EMBODIMENT

Operations of the second embodiment 50 are the same as the first embodiment 10 except that when magnets 54 on rim 14 pass by wire coils 52, electrical power is generated. In reverse mode to extracting power, electricity can be passed through coils 52 creating a force on magnets 54 that causes rim 14 to start rotating. This reverse mode is useful when there is insufficient wind to start the windmill, but sufficient wind to generate power once the windmill is jump-started.

Conclusions, Ramifications, and Scope

The Multiaxel windmill is a substantial advance in the state of the art of windmills. It will lower the cost of wind power, making it a more practical than environmentally damaging coal and oil power generators. In addition to being more cost-efficient than other windmills, this windmill is less harmful to birds.

I claim:

1. A windmill, comprising:

a rigid structural base;

two or more rolling elements supported by said base;

an endless circulating rim supported by said rolling elements;

a plurality of blades attached to said rim;

wherein wind forces move said blades and bring said rim into rotation.

2. Windmill of claim 1 where in said rolling elements are wheels.

3. Windmill of claim 1 where in said rolling elements are bearings.

4. Windmill of claim 1 further including axels to support said rolling elements.

5. Windmill of claim 1 further including a motor to start the windmill rotating.

6. Windmill of claim 1 further including a wind tail attached to said base to position said blades in the direction of the wind.

7. Windmill of claim 1 further including a power generator to convert windmill motion into electrical energy.

8. Windmill of claim 1 where in said rim is a magnetic for said power generator.

9. Windmill of claim 1 where in said rim is a magnetic for said starter motor.

10. Windmill of claim 1 further including wire coils supported on said base to generate electrical power from motion of said magnetic.

11. Windmill of claim 1 further including wire coils supported on said base to force said rim to rotate.

* * * * *